(12) United States Patent
Wang et al.

(10) Patent No.: US 8,081,077 B2
(45) Date of Patent: Dec. 20, 2011

(54) SYSTEM AND METHOD FOR MANAGING MATERIALS OF A WAREHOUSE

(75) Inventors: Chi-Chih Wang, Taipei Hsien (TW); Bing-Yu He, Shenzhen (CN); Zhong-Gen Zhan, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 526 days.

(21) Appl. No.: 12/343,500

(22) Filed: Dec. 24, 2008

(65) Prior Publication Data

US 2009/0167501 A1 Jul. 2, 2009

(30) Foreign Application Priority Data

Dec. 28, 2007 (CN) .......................... 2007 1 0203526

(51) Int. Cl.
*G08B 13/14* (2006.01)
(52) U.S. Cl. .................. 340/572.1; 705/28; 235/385
(58) Field of Classification Search ............... 340/572.1; 705/7.26, 7.13, 7.25, 28, 29; 235/385
See application file for complete search history.

(56) References Cited

U.S. PATENT DOCUMENTS

| | | | |
|---|---|---|---|
| 2006/0282340 A1* | 12/2006 | Morand et al. .................. 705/28 |
| 2008/0133309 A1* | 6/2008 | Maggio ............................. 705/9 |
| 2008/0255968 A1* | 10/2008 | Heinrichs ....................... 705/28 |
| 2010/0090004 A1* | 4/2010 | Sands et al. ................... 235/385 |

FOREIGN PATENT DOCUMENTS

| | | |
|---|---|---|
| CN | 1450480 A | 10/2003 |
| CN | 1752989 A | 3/2006 |
| CN | 1776719 A | 5/2006 |

* cited by examiner

*Primary Examiner* — John A Tweel, Jr.
(74) *Attorney, Agent, or Firm* — Altis Law Group, Inc.

(57) ABSTRACT

A system for managing materials of a warehouse includes a computer and a radio frequency identification (RFID) reader to allocate a warehouse location for a material to be imported. The RFID reader reads a serial number corresponding to the RFID tag of the imported material. The computer acquires information of the material according to the serial number and updates inventory of the warehouse.

14 Claims, 4 Drawing Sheets

SYSTEM AND METHOD FOR MANAGING MATERIALS OF A WAREHOUSE

BACKGROUND

1. Field of the Invention

Embodiments of the present disclosure relate to warehouse management systems and methods, and more particularly to a system and method for managing materials of a warehouse.

2. Description of Related Art

General warehouses can be divided into several categories according to uses thereof. The general warehouses may include one in companies to store goods of daily sales, one in factories for storing stock materials and manufactured products for retailing, one in a large warehouse for temporary storage of import/export goods for inspection in airports and the Customs, and one in a specialized warehouse usually in an industrial or factory area for use with companies nearby. Therefore, it is necessary for workers to examine imported materials and exported materials stored in the warehouse. However, timely updating inventory of the warehouse when the materials are imported or exported from the warehouse is inconvenient.

Therefore, an effective system and method for managing imported/exported materials to/from a warehouse is desired to overcome the above-described shortcomings.

DETAILED DESCRIPTION OF CERTAIN INVENTIVE EMBODIMENTS

All of the processes described below may be embodied in, and fully automated via, functional modules executed by one or more general purpose processors. The functional modules may be stored in any type of computer-readable medium or other computer storage device. Some or all of the methods may alternatively be embodied in specialized computer hardware or communication apparatus.

Figure 1:
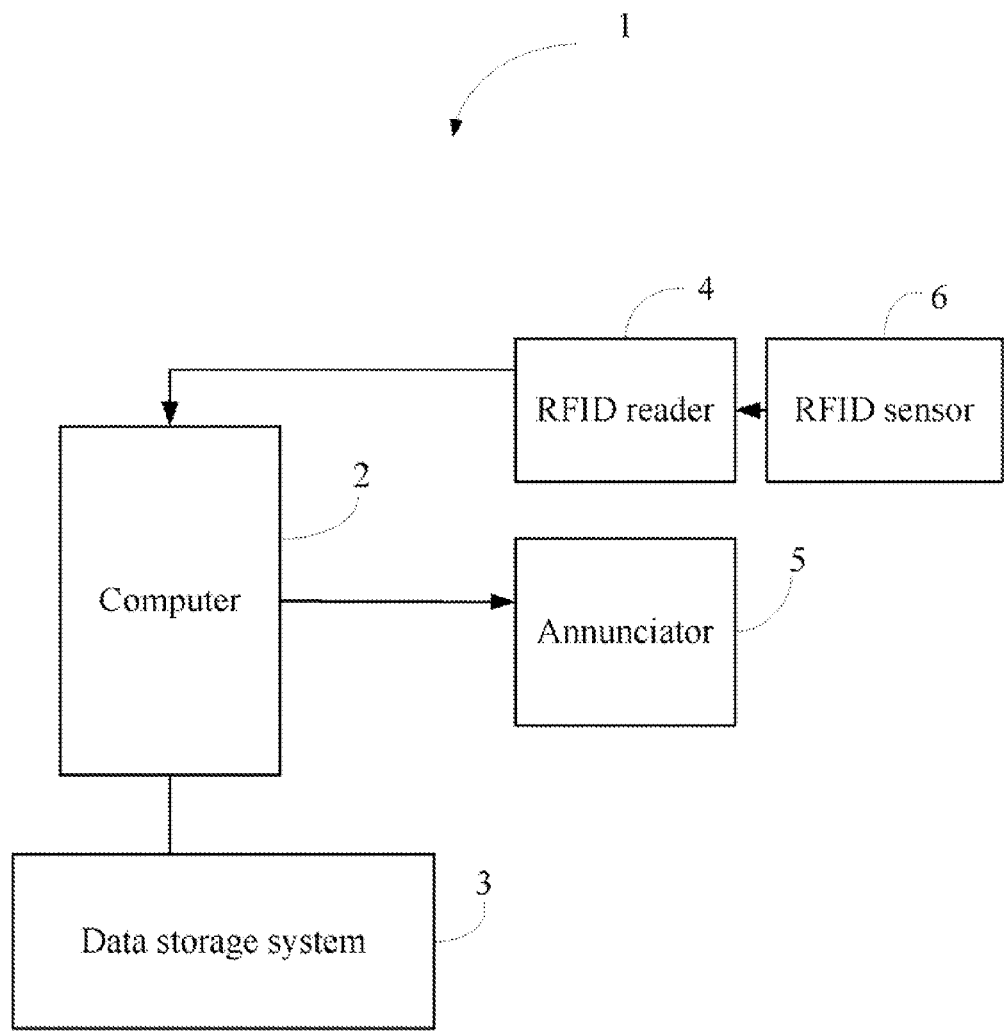
FIG. 1 is a block diagram of one embodiment of a system for managing materials of a warehouse.

FIG. 1 is a block diagram of one embodiment of a system 1 for managing materials of a warehouse. In one embodiment, the system 1 includes a computer 2, a data storage system 3, a radio frequency identification (RFID) reader 4, and an annunciator 5. The computer 2 is connected to the data storage system 3, which stores material information of the materials and inventory information of the warehouse. Each of the materials has a unique RFID tag, which stores a serial number corresponding to information of the material.

The RFID reader 4 is connected to the computer 2 via communication port, such as a serial port, and is installed with an RFID sensor 6. The RFID sensor 6 scans a RFID tag of each of the materials when the material is being imported to the warehouse or exported from the warehouse. Then the RFID reader 4 reads the serial number of the material, and sends the serial number to the computer 2. The computer 2 obtains the material information corresponding to the serial number of the material. If the obtained material information is null, the computer 2 sounds the annunciator 5. For example, the annunciator 5 may be sounded if the material to be imported to the warehouse is incorrectly determined according to the user requirement, or the information of the imported material is not stored in the data storage system 3 successfully.

Figure 2:
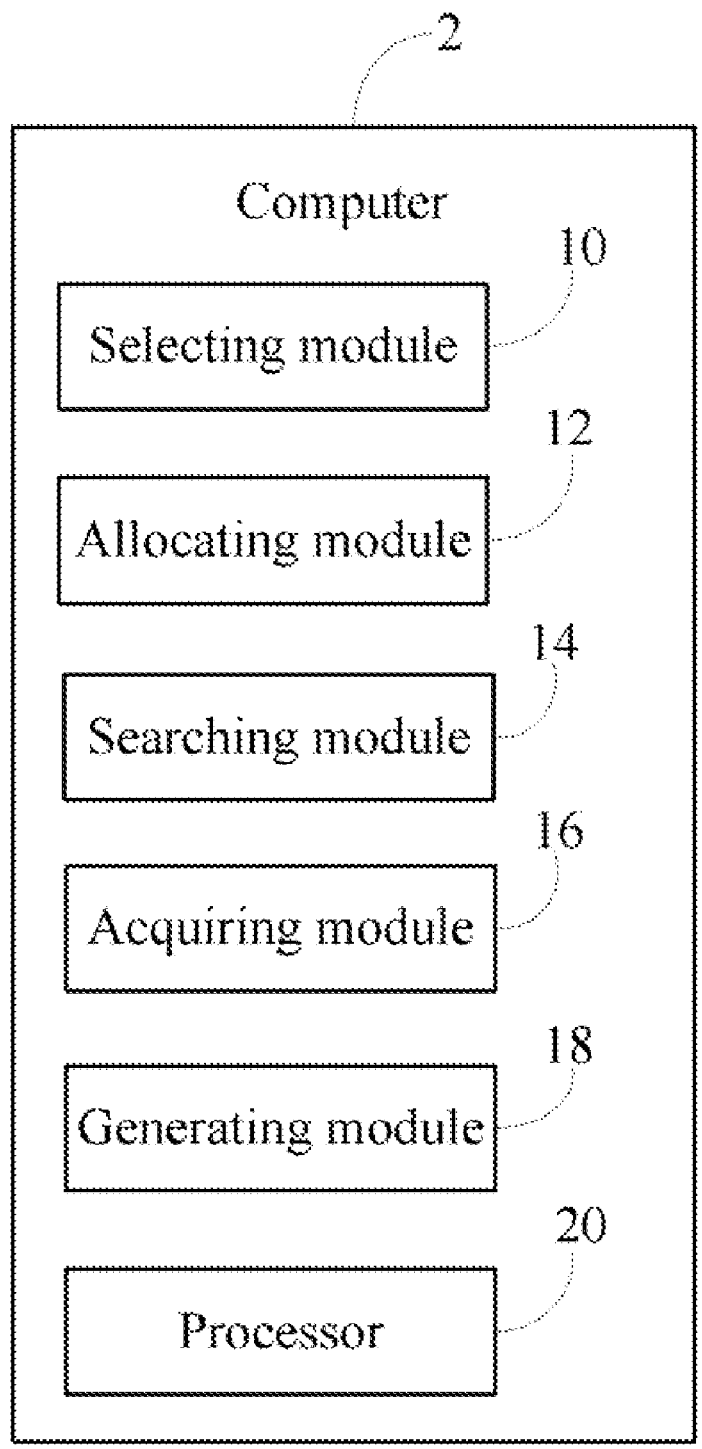
FIG. 2 is a block diagram of one embodiment of a computer comprising function modules.

FIG. 2 is a block diagram of one embodiment of the computer 2 comprising function modules. In one embodiment, the computer 2 may include a selecting module 10, an allocating module 12, a searching module 14, an acquiring module 16, and a generating module 18. It may be understood that one or more specialized or general purpose processors, such as a processor 20, may be used to execute one or more operations for the functional modules 10, 12, 14, 16, and 18. These functional modules may be used to perform certain functions for managing the imported and exported materials of the warehouse.

The selecting module 10 is configured for determining to select a material of the warehouse to be imported or exported according to a user's requirement.

The allocating module 12 is configured for allocating a warehouse location of the warehouse for storing the material to be imported. The allocating module 12 is also configured for recording the warehouse location information into the data storage system 3.

The searching module 14 is configured for searching the warehouse location of the exported material according to the information of the exported material in the data storage system 3.

The acquiring module 16 is configured for acquiring information of the material from the data storage system 3 according to the serial number read by the RFID reader 4 when the material is being entered into or exited from the warehouse. The acquiring module 16 is further configured for detecting if the acquired information is null. If the acquired information is null, the acquiring module 16 sounds the annunciator 5.

The generating module 18 is configured for updating the inventory information about the materials of the warehouse in the data storage system 3, and for generating an import report to show the import information of the imported material or an export report to show the export information of the exported material if the acquired information is not null. For example, if the acquired information of the imported material is not null, the generating module 18 increases the inventory about the materials of the warehouse by adding one volume to the inventory. If the acquired information of the exported material is not null, the generating module 18 decreases the inventory about the materials of the warehouse by subtracting one volume from the inventory.

Figure 3:
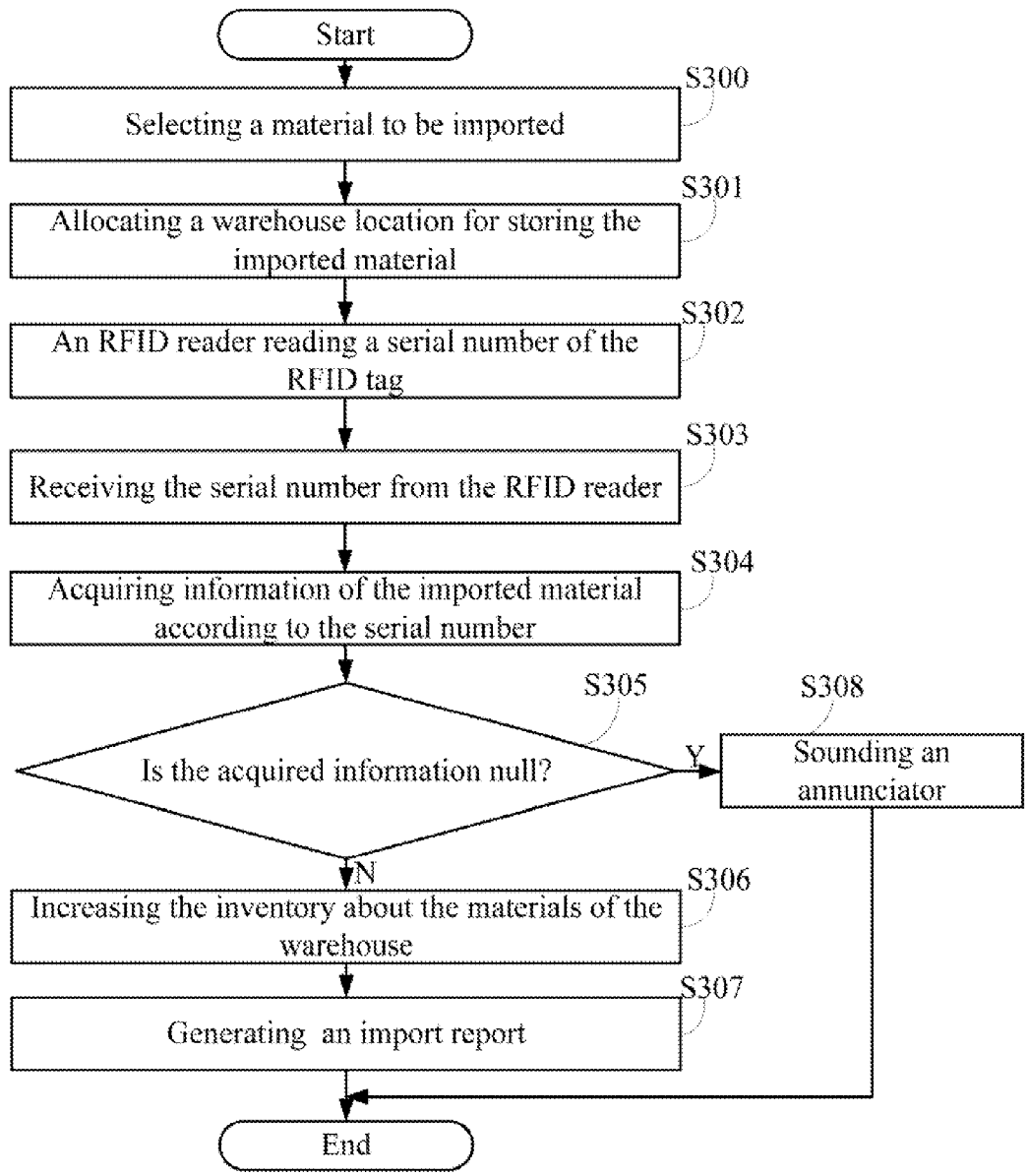
FIG. 3 is a flowchart of one embodiment of a method for managing imported materials to a warehouse.

FIG. 3 is a flowchart of one embodiment of a method for managing imported materials from a warehouse. Depending on the embodiment, additional blocks may be added, others removed, and the ordering of the blocks may be changed.

In block S300, the selecting module 10 determines to select a material to be imported to the warehouse according to a user's requirement. The material may be computer hard drives for examples.

In block S301, the allocating module 12 allocates a warehouse location of the warehouse for storing the imported material, and records the warehouse location information into the data storage system 3.

In block S302, the RFID sensor 6 scans a RFID tag of the imported material when the imported material is being entered into the warehouse, then the RFID reader 4 reads a serial number of the RFID tag of the imported material.

In block S303, the RFID reader 4 sends the serial number to the computer 2.

In block S304, the acquiring module 16 acquires information of the imported material from the data storage system 3 according to the serial number.

In block S305, the acquiring module 16 detects if the acquired information is null.

If the acquired information is not null, in block S306, the generating module 18 increases the inventory about the materials of the warehouse by adding one volume to the inventory.

In block S307, the generating module 18 generates an import report to show the import information of the imported material. In one embodiment, the import report can be stored in the data storage system 3. In another embodiment, the import report can be displayed on a display of the computer 2 to the user of the warehouse.

In block S308, if the acquired information is null, the annunciator 5 is sounded by the acquiring module 16 to alarm that the information of the imported material has an error. For example, the annunciator 5 may be sounded if the material to be imported to the warehouse is incorrectly determined according to the user requirement, or the information of the imported material is not stored in the data storage system 3 successfully.

Figure 4:
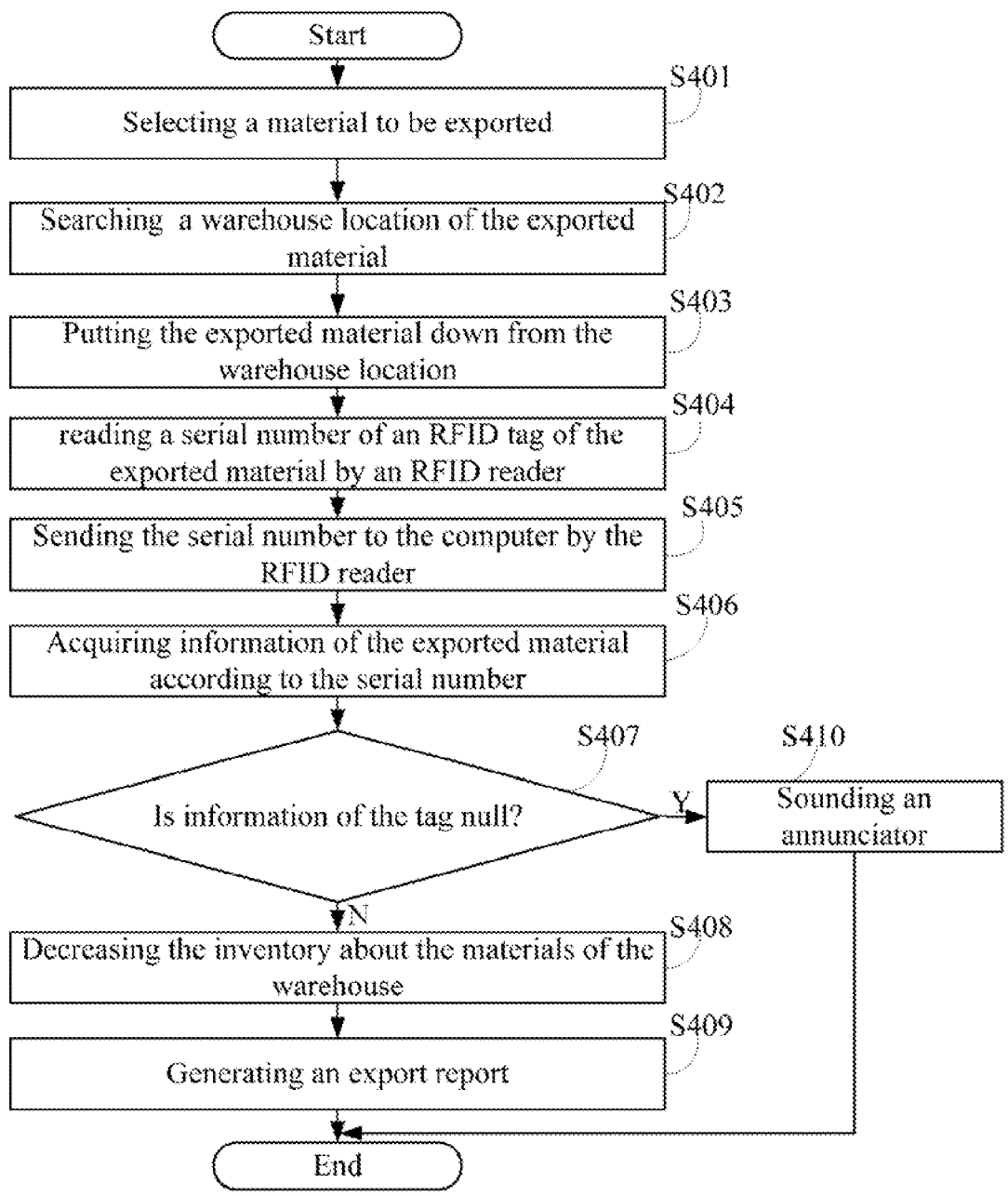
FIG. 4 is a flowchart of one embodiment of a method for managing exported materials from a warehouse.

FIG. 4 is a flowchart of one embodiment of a method for managing exported materials of a warehouse. Depending on the embodiment, additional blocks may be added, others removed, and the ordering of the blocks may be changed.

In block S401, the selecting module 10 determines to select a material to be exported from the warehouse according to the user's requirement.

In block S402, the searching module 14 searches a warehouse location of the exported material according to the information of the exported material in the data storage system 3.

In block S403, the exported material is determined to be put down from the warehouse location by the searching module 14 after the warehouse location information of the exported material is searched.

In block S404, the RFID sensor 6 scans a RFID tag of the exported material when the exported material is being exited from the warehouse location of the warehouse, then the RFID reader 4 reads a serial number of the RFID tag of the exported material.

In block S405, the RFID reader 4 sends the serial number to the computer 2.

In block S406, the acquiring module 16 acquires information of the exported material from the data storage system 3 according to the serial number.

In block S407, the acquiring module 16 detects if the acquired information is null.

In block S408, if the acquired information is not null, the generating module 18 decreases the inventory about the materials of the warehouse by subtracting one volume from the inventory.

In block S409, the generating module 18 generates an export report to show the export information of the exported material. In one embodiment, the export report can be stored in the data storage system 3. In another embodiment, the export report can be displayed on the a display of the computer 2 to the user of the warehouse.

In block S410, if the acquired information is null, the acquired module 16 sounds the annunciator 5 to alarm that the information of the exported material has an error. For example, the annunciator 5 may sound if exported material of the warehouse is incorrectly determined according to the user requirement, or the information of the exported material is not stored in the data storage system 3 successfully.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computing system for managing materials of a warehouse, the system comprising:
    a data storage system for storing information of materials to be imported or exported from the warehouse;
    a radio frequency identification (RFID) reader having an RFID sensor for scanning a RFID tag of each of the materials when the material is imported to the warehouse or exported from the warehouse, and reading a serial number from the RFID tag of the material; and
    a computer for receiving the serial number of the material from the RFID reader, the computer comprising:
    a selecting module configured for determining to select the imported or exported material according to a user's requirement;
    an allocating module configured for allocating a warehouse location of the warehouse for storing the imported material;
    an acquiring module configured for acquiring the information of the material from the data storage system according to the serial number of the RFID tag when the material is being entered into the warehouse or exited from the warehouse; and
    a generating module configured for updating inventory information about the materials of the warehouse in the data storage system.

2. The system of claim 1, wherein the allocating module is further configured for storing information about the warehouse location of the imported material into the data storage system.

3. The system of claim 1, further comprising an annunciator connected to the computer for generating an alarm.

4. The system of claim 3, wherein the acquiring module is further configured for triggering the annunciator to generate the alarm if the acquired information of the imported or exported material is null.

5. The system of claim 1, wherein the computer further comprises a searching module configured for searching the warehouse location of the exported material according to the information of the imported material.

6. The system of claim 1, wherein the generating module further configured for generating an import report to show import information of the imported material, or an export report for showing export information of the exported material.

7. A computer-implemented method for managing imported materials of a warehouse, the method comprising:
    determining a selected material to be imported to the warehouse;
    scanning a radio frequency identification (RFID) tag of the imported material when the imported material is being entered into the warehouse, and reading a serial number from the RFID tag of the imported material;
    allocating a warehouse location of the warehouse for storing the imported material;
    acquiring information of the imported material from a data storage system according to the serial number of the RFID tag when the imported material is being entered into the warehouse; and
    increasing inventory of all the materials stored in the warehouse by adding one volume to the inventory in the data storage system; and generating an import report to show the information of the imported material.

8. The method of claim 7, further comprising:
storing the warehouse location information of the imported material into the data storage system.

9. The method of claim 7, further comprising:
sounding an annunciator to alarm if the information of the imported material is null.

10. The method of claim 7, further comprising:
storing the export report in the data storage system, or displaying the export report on a display of a computer.

11. A computer-implemented method for managing exported materials of a warehouse, the method comprising:
determining a selected material to be exported from the warehouse;
scanning a radio frequency identification (RFID) tag of the exported material when the exported material is being entered into the warehouse, and reading a serial number from the RFID tag of the exported material;
acquiring information of the exported material from a data storage system according to the serial number of the RFID tag when the exported material is being exited from the warehouse;
decreasing inventory about the materials of the warehouse in the data storage system; and
generating an export report to show the information of the exported material.

12. The method of claim 11, further comprising:
searching warehouse location of the exported material according to the information of the exported material stored in the data storage system.

13. The method of claim 11, further comprising:
sounding an annunciator to alarm if the information of the exported material is null.

14. The method of claim 11, further comprising:
storing the export report in the data storage system, or displaying the export report on a display of a computer.

* * * * *